(12) United States Patent
Krier

(10) Patent No.: US 7,147,776 B2
(45) Date of Patent: Dec. 12, 2006

(54) METHOD FOR TREATING AN EFFLUENT IN THREE BIOLOGICAL STEPS

(75) Inventor: Jean Krier, Athis-Mons (FR)

(73) Assignee: Syndicat Interdepartemental pour l'Assainissement de l'Agglomeration Parisienne (SIAAP), Paris (FR)

( * ) Notice: Subject to any disclaimer, the term of this patent is extended or adjusted under 35 U.S.C. 154(b) by 11 days.

(21) Appl. No.: 10/519,468

(22) PCT Filed: Jun. 11, 2003

(86) PCT No.: PCT/FR03/01739

§ 371 (c)(1),
(2), (4) Date: Jul. 1, 2005

(87) PCT Pub. No.: WO2004/002903

PCT Pub. Date: Jan. 8, 2004

(65) Prior Publication Data

US 2005/0252854 A1    Nov. 17, 2005

(30) Foreign Application Priority Data

Jun. 28, 2002 (FR) .................................. 02 08108

(51) Int. Cl.
*C02F 3/30* (2006.01)
*C02F 3/12* (2006.01)

(52) U.S. Cl. ................. 210/605; 210/615; 210/621

(58) Field of Classification Search ............. 210/605, 210/615, 616, 620, 621, 622, 623, 252, 259, 210/903

See application file for complete search history.

(56) References Cited

U.S. PATENT DOCUMENTS

| 4,500,429 A | 2/1985 | Reimann et al. |
| 5,062,957 A | 11/1991 | Berreby |
| 5,271,831 A | 12/1993 | Oremland |
| 5,643,453 A | 7/1997 | Pannier et al. |

(Continued)

FOREIGN PATENT DOCUMENTS

DE         29615824      *    1/1997

(Continued)

*Primary Examiner*—Fred G. Prince
(74) *Attorney, Agent, or Firm*—Marshall, Gerstein & Borun LLP

(57) ABSTRACT

The invention concerns a method for biological treatment of an effluent in order to purify it comprising treating said effluent in a first step which consists in an anaerobic biological treatment (13), with sulphate-reducing biomass fixed on a mobile support (13), producing a first effluent, then treating the first effluent in a second which consists in an anoxic biological treatment (14), with stationary sulphur-oxidizing biomass (14), producing a second effluent, and finally treating the second effluent in a third step which consists in an aerobic biological treatment (15), with stationary nitrifying biomass, producing a third purified effluent. Said method further comprises recycling part of the effluent present in the third step to the second step. The biomass present in the first step comprises sulphate-reducing bacteria, the biomass present in the second step comprises sulphur-oxidizing bacteria and the biomass present in the third step comprises nitrifying bacteria. The invention also concerns a device for implementing said method.

10 Claims, 1 Drawing Sheet

U.S. PATENT DOCUMENTS

| | | | |
|---|---|---|---|
| 5,705,072 A * | 1/1998 | Haase | 210/605 |
| 5,863,433 A | 1/1999 | Behrends | |
| 5,891,408 A | 4/1999 | Buisman et al. | |
| 5,919,367 A | 7/1999 | Khudenko | |
| 6,015,496 A * | 1/2000 | Khudenko | 210/603 |
| 6,183,643 B1 * | 2/2001 | Goodley | 210/605 |
| 2006/0096917 A1 * | 5/2006 | Rose et al. | 210/614 |

FOREIGN PATENT DOCUMENTS

| | | |
|---|---|---|
| DE | 199 32 903 | 7/1999 |
| EP | 0 979 803 | 6/1999 |
| WO | WO-91/6269 | 4/1991 |
| WO | WO-99/41205 | 2/1999 |
| WO | WO-00/27763 | 11/1999 |

* cited by examiner

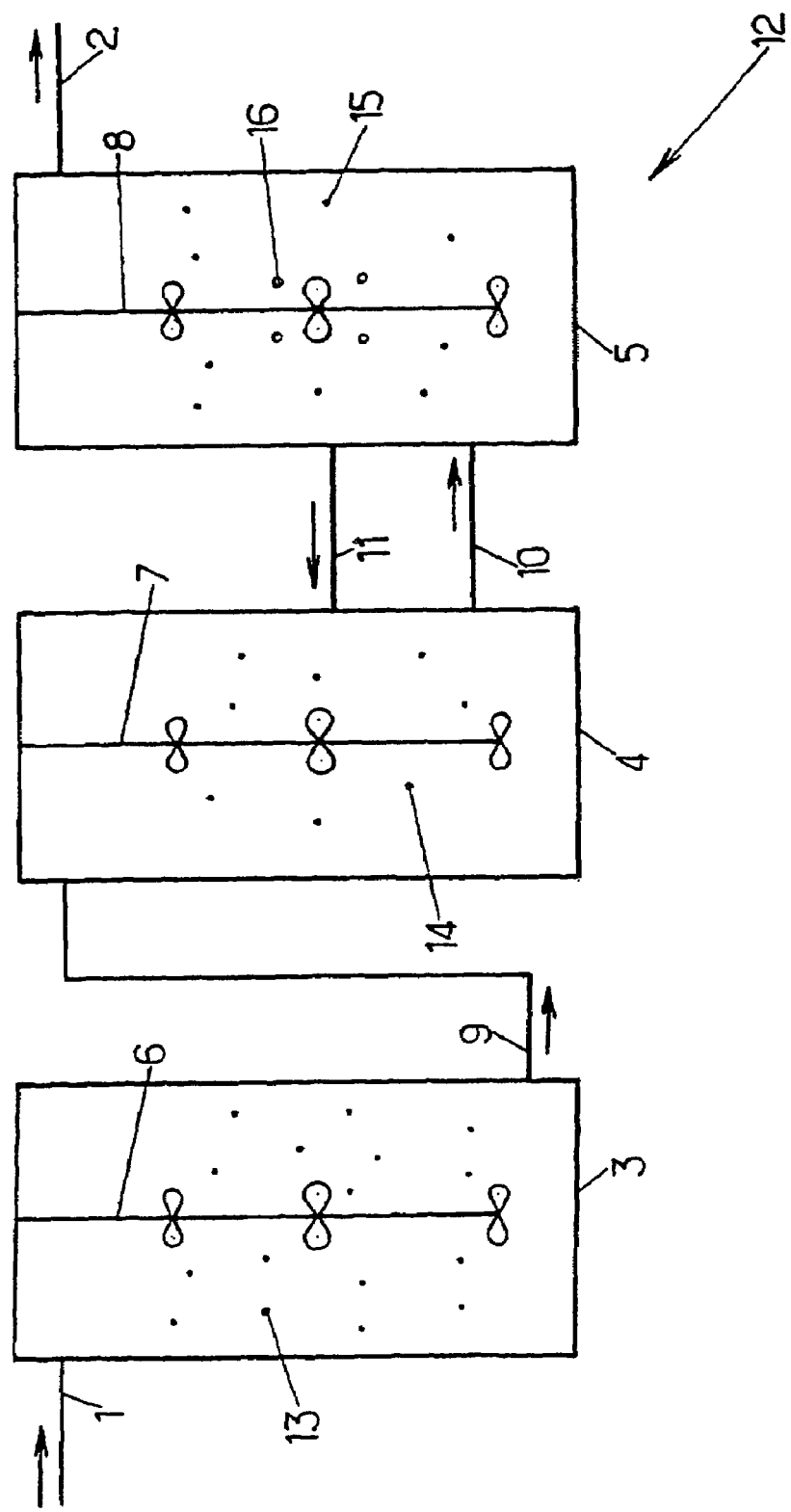

METHOD FOR TREATING AN EFFLUENT IN THREE BIOLOGICAL STEPS

The invention relates to a process for the biological treatment of an effluent in order to purify it, in particular in the field of treating mainly urban wastewater. The invention also relates to a device for performing such a process.

Various processes exist for the biological treatment of the pollution of mainly urban waters. These treatments are based on the capacity of biomass to remove the biodegradable pollution either by assimilating it in the bacterial flock, or by converting it into gaseous molecules ($CO_2$ for the carbon-based pollution; $N_2$ for the nitrogen-based pollution via nitrification of the nitrogen to nitrates via the nitrifying biomass, followed by denitrification of the nitrates to atmospheric nitrogen via the denitrifying biomass). These treatments may be extensive, and are then based on the treating capacity of the bacteria present in the urban water, with the aid of oxygen provided by the exchanges with the atmosphere (generally by insufflation of air) and of photosynthesis (generally via the system of lagooning). These treatments may be intensive, and then call for the use of artificial bacterial cultures, which "consume" the polluting materials. Three categories of artificial biological process are distinguished. Firstly, there are "free-culture" installations, in which the bacterial culture is held in suspension in the flow of wastewater to be treated, among which are the "activated sludge" installations, an aerobic purification system in an aerated and stirred tank. Secondly, there are "fixed-culture" installations, in which the bacterial culture, also known as the "biofilm", "biological film" or "biomass", rests on a fixed support (stone, plastic or fine granular medium). Thirdly, there are "mixed-culture" installations, i.e. installations comprising suspensions of bacteria fixed on a mobile support such as plastic.

These processes thus lead to the discharge of a treated water; gaseous molecules (mainly $CO_2$ and $N_2$ in aerobic treatment, but also $CH_4$ in anaerobic treatment), which are expelled into the atmosphere, directly or optionally after combustion; excess sludges, consisting mainly of the biomass produced during the treatment; and nonbiodegradable decantable pollution.

Patent application EP-A-2 0 979 803 describes a process for treating an effluent by denitrification, comprising an aerobic nitrification treatment zone, which also allows a certain amount of organic decomposition, followed by an anaerobic denitrification treatment zone comprising a filter zone. Said anaerobic denitrification treatment zone performs the conversion of the sulfates to sulfides, and then the heterotrophic conversion of the nitrates to nitrogen gas and in parallel the conversion of the sulfides to sulfates. In practice, the presence of nitrates in the anaerobic denitrification treatment zone will pose a problem over time since the oxido-reduction potential or redox potential in the reactor is not readily compatible with the activity of sulfate-reducing bacteria. Furthermore, the production of sulfides from sulfates can take place, with the bacteria generally used, only in the presence of carbon. However, virtually all the carbon has been consumed in the first step. It is thus extremely difficult to produce sulfides in the denitrification zone. This is why it is proposed to introduce sulfides into this zone, which is relatively disagreeable and undesirable in terms of safety and unpleasant odors.

Patent application WO 00/27763 describes a water treatment installation comprising one or two ascending-flow anaerobic reactor(s), with a mixer, followed by an aerobic reactor. The first anaerobic reactor(s) perform(s) a sulfate reduction in strictly anaerobic medium. The effluent leaving the installation is declared free of pollution (N, P) via biological action, and of heavy metals and nonbiodegradable toxic materials via physicochemical action. This installation comprises a sludge circulation device linked to the anaerobic reactor(s), which emburdens the treatment. Moreover, such a sludge is rich in sulfides, which poses odor and safety problems.

Consequently, there is still a need to perform an effluent treatment that manages both to remove the nitrogen and carbon pollution, while at the same time producing an effluent free of olfactory offensiveness, i.e. which is in accordance with the practices of the profession. The process of the invention can advantageously satisfy this need.

The process according to the invention is a process for the biological treatment of an effluent in order to purify it, which comprises treatment of the majority of said effluent, preferably virtually all of said effluent, in a first step of anaerobic biological treatment, with biomass fixed onto a mobile support, giving a first effluent, the biomass present in the first step comprising at least sulfate-reducing bacteria, followed by treatment of the majority of the first effluent, preferably of virtually all of said first effluent, in a second step of anoxic biological treatment, with fixed biomass, giving a second effluent, the biomass present in the second step comprising at least sulfur-oxidizing bacteria, and finally treatment of the majority of the second effluent, preferably of virtually all of the second effluent, in a third step of aerobic biological treatment, with fixed biomass, giving a third purified effluent, the biomass present in the third step comprising at least nitrifying bacteria, said process also comprising recycling of some of the effluent present in the third step into the second step (where it is treated).

Thus, in the first step of anaerobic biological treatment, depollution of the majority of the carbon-based compounds is essentially performed, in the presence of sulfate-reducing bacteria, said compounds being converted in a first stage into volatile acids, with production of dissolved $CO_2$, without discharge of $CO_2$ into the atmosphere. Next, said volatile acids are almost totally assimilated in a second stage by the sulfate-reducing bacteria, at the same time that virtually all of the sulfates are converted into sulfides. Specifically, the conversion of the carbon-based pollution does not go as far as methanization, since it is a very long step that takes place in the presence of methane-generating bacteria. In the second step of anoxic biological treatment, in the absence of oxygen, denitrification essentially takes place, with conversion of virtually all the recycled nitrates, originating from the third step, into nitrogen gas $N_2$ and $NO_3$, with in parallel conversion of virtually all the sulfides via sulfur oxidation (autotrophic denitrification). This is why the provision of $O_2$ is unnecessary, since it is the conversion of the sulfides to sulfates that allows the nitrates to be reduced to nitrogen. Furthermore, in this second step, a substantial reduction of the carbon-based pollution more advantageously takes place. Finally, in the third step of aerobic biological treatment, aerobic nitrification takes place, virtually in the absence of carbon, during which virtually all the ammonia is converted into nitrates. Recycling of some of the effluent present in the third step into the second step takes place either using the effluent present in the third step, which is removed, or using the third effluent leaving the third step. It is recirculated into the second step, preferably at the entry of the second step by mixing with the second effluent. Advantageously, such recycling makes it possible to reduce the level of nitrates exiting in the third effluent.

Advantageously, virtually no gaseous effluent, apart from the nitrogen in the second step, is emitted in the first and second steps of the process according to the invention. In particular, the $CO_2$ generated during the first step is generally dissolved in the first effluent.

Advantageously, such a process makes it possible to treat effluent arriving to be freed of both nitrogen and carbon pollution, without causing any particular olfactory offensiveness, essentially freed of all pollution via the sulfides, in contrast with documents EP-A2 0 979 803 and WO 00/27763.

Thus, the process according to the invention makes it possible particularly advantageously to exploit the biological sulfur redox cycle, firstly to remove the carbon-based pollution without introducing oxygen, and secondly to ensure autotrophic denitrification without a carbon source.

In a particularly advantageous manner, such a process also makes it possible to greatly reduce the oxygen consumption for the reduction of the carbon-based pollution. Specifically, the majority of the carbon-based pollution is removed in the first two biological treatment steps, under anaerobic and anoxic conditions.

Furthermore, since the oxygen demand is reduced, the flow rates of air discharged into the atmosphere are thus decreased and comprise less, or even virtually no, $CO_2$. Consequently, it is of benefit to the environment, since the toxicity of $CO_2$ as a "greenhouse" gas is known.

The process according to the invention also advantageously makes it possible to limit the type of sludge to be treated to that extracted from a downstream decantation, since virtually all the MIS (Matter in Suspension) passes through the system without the need for further extraction of sludge (associated with the process according to the invention) as in patent application WO 00/27763, and without impeding the correct functioning of the process.

Finally, the process according to the invention advantageously allows a low production of sludge relative to the conventional aerobic systems for reducing the carbon-based pollution. Specifically, the nitrifying anaerobic and aerobic bacterial systems are of low energy, with very low growth rates.

Moreover, the energy provided for the first step is limited essentially to a mixing energy, which allows a saving in energy compared with conventional aerobic systems. This advantageous combination of saving in energy and of appreciable reduction in discharge of $CO_2$ into the atmosphere subscribes particularly well to the politics of durable growth.

According to one embodiment of the invention, the majority, and preferably virtually all, of the effluent to be treated in said process is screened and/or decanted, preferably screened, in a step prior to said treatment process.

According to one preferred embodiment of the invention, the majority, and preferably virtually all, of the third effluent derived from said process is decanted.

The biomass present in the first step comprises at least sulfate-reducing bacteria. These bacteria are generally chosen from the group formed by bacteria of Desulfovibrio and Desulfatomaculum type.

The biomass present in the second reactor step comprises at least sulfur-oxidizing bacteria. These bacteria are generally chosen from the group formed by bacteria of Thiotrix and Beggiatoa type.

The biomass present in the third step comprises at least nitrifying bacteria. These bacteria are generally chosen from the group formed by bacteria of Nitrosomonas and Nitrobacter type.

In the case of a fixed support, the support for the biomass present in the second and/or third step of the process according to the invention is generally chosen from the group formed by mineral materials, for instance sands and pozzolana, and synthetic materials, such as the Biostyrene® sold by the company OTV or Biolite® sold by the company Degremont.

In the case of a mobile support, the support for the biomass present in the first, second and/or third step of the process according to the invention is generally chosen from the group formed by the plastics known to those skilled in the art. Commercial examples of such plastics that may be mentioned include the materials KMT 1, KMT 2 and AMT from the company Kaldnes, the materials Biolite®, Biocube® and Flocor RMP from the company Degremont, or the material Natrix Major from the company Anox, and also the material Bioflow 9 from the company Cera Com.

The second step of anoxic treatment is generally a treatment with biomass fixed onto a fixed and/or mobile support, preferably a fixed or mobile support.

According to one embodiment of the invention, the second step of anoxic treatment is a treatment with biomass fixed onto a fixed support. For example, the biomass is a biofilter comprising at least sulfur-oxidizing bacteria. In such a case, the effluent to be treated in said process is generally decanted in a step prior to said treatment process.

According to another preferred embodiment of the invention, the second step of anoxic treatment is a treatment with biomass fixed onto a mobile support.

The third step of aerobic treatment is generally a treatment with biomass fixed onto a fixed and/or mobile support, preferably a fixed or mobile support.

According to one embodiment of the invention, the third step of aerobic treatment is a treatment with biomass fixed onto a fixed support. For example, the biomass is a biofilter comprising at least nitrifying bacteria. In such a case, the effluent to be treated in said process is generally decanted in a step prior to said treatment process.

According to another preferred embodiment of the invention, the third step of aerobic treatment is a treatment with biomass fixed onto a mobile support.

According to one particularly preferred embodiment of the invention, the second step of anoxic treatment is a treatment with biomass fixed onto a mobile support and the third step of aerobic treatment is a treatment with biomass fixed onto a mobile support. In such a case, advantageously, the energy provided is essentially a mixing energy in the various steps.

According to one preferred embodiment of the invention, the portion of the effluent present in the third step that is recycled into the second step is recycled in a proportion, relative to the second effluent, of from 50% to 150%, preferably 80% to 120% and even more preferably of about 100%, by volume.

Finally, the invention relates to a device for performing the process described previously. Thus, the invention relates to a device for the biological treatment of an effluent in order to purify it, for the implementation of the process according to the invention, comprising a first treatment reactor, with biomass fixed onto a mobile support, followed by a second anoxic treatment reactor, with fixed biomass, and finally a third aerobic treatment reactor, with fixed biomass, and also the means for transporting effluent to the first reactor, from the first to the second reactor, from the second to the third reactor, and the means for removing effluent from the third reactor, said device also comprising at least one means for recycling from the third reactor to the second reactor.

Said recycling means is generally such that it can recycle some of the effluent that may be present in the third reactor and/or some of the effluent that may leave the third reactor.

The first reactor generally comprises from 20% to 80%, preferably from 40% to 60%, for example about 40%, by volume of mobile support. This support is generally chosen from the group formed by the plastics known to those skilled in the art. Commercial examples of such plastics that may be mentioned include the materials KMT 1, KMT 2 and AMT from the company Kaldnes, the materials Biolite®, Biocube® and Flocor RMP from the company Degremont, or the material Natrix Major from the company Anox, and also the material Bioflow 9 from the company Cera Com.

Preferably, such a device also comprises at least one pretreatment reactor in which the majority, and preferably all, of said effluent to be treated is screened and/or decanted, preferably screened, before entering said first reactor.

Preferably, such a device also comprises at least one posttreatment reactor. In said reactor, the majority, and preferably virtually all, of the effluent that can leave the third reactor is decanted.

According to the invention, the first reactor comprises a biomass comprising sulfate-reducing bacteria. These bacteria are generally chosen from the group formed by bacteria of Desulfovibrio and Desulfatomaculum type.

According to one preferred embodiment of the invention, the second reactor comprises a biomass fixed onto a mobile support.

According to another embodiment of the invention, the second reactor comprises a biomass fixed onto a fixed support. In such a case, the device also generally comprises at least one pretreatment reactor in which the majority, and preferably virtually all, of the effluent to be treated in the second reactor is decanted before entering said second reactor.

The second reactor generally comprises from 20% to 80% and preferably from 40% to 60%, for example about 40%, by volume of fixed or mobile support.

In the case of a fixed support, the support is generally chosen from the group formed by mineral materials, for instance sands and pozzolana, and synthetic materials, such as the Biostyrene® sold by the company OTV or Biolite® sold by the company Degremont.

In the case of a mobile support, the support is generally chosen from the group formed by the plastics known to those skilled in the art. Commercial examples of such plastics that may be mentioned include the materials KMT 1, KMT 2 and AMT from the company Kaldnes, the materials Biolite®, Biocube® and Flocor RMP from the company Degremont, or the material Natrix Major from the company Anox, and also the material Bioflow 9 from the company Cera Com.

According to the invention, the second reactor comprises a biomass comprising sulfur-oxidizing bacteria. These bacteria are generally chosen from the group formed by bacteria of Thiotrix and Beggiatoa type.

According to one embodiment of the invention, the third reactor comprises a biomass fixed onto a mobile support.

According to another embodiment of the invention, the third reactor comprises a biomass fixed onto a fixed support. In such a case, the device also generally comprises at least one pretreatment reactor in which the majority, and preferably virtually all, of the effluent to be treated in the third reactor is decanted before entering said third reactor.

The third reactor generally comprises from 20% to 80% and preferably from 40% to 60%, for example about 40%, by volume of fixed or mobile support.

In the case of a fixed support, the support is generally chosen from the group formed by mineral materials, for instance sands and pozzolana, and synthetic materials, such as the Biostyrene® sold by the company OTV or Biolite® sold by the company Degremont.

In the case of a mobile support, the support is generally chosen from the group formed by the plastics known to those skilled in the art. Commercial examples of such plastics that may be mentioned include the materials KMT 1, KMT 2 and AMT from the company Kaldnes, the materials Biolite®, Biocube® and Flocor RMP from the company Degremont, or the material Natrix Major from the company Anox, and also the material Bioflow 9 from the company Cera Com.

According to the invention, the third reactor comprises a biomass comprising nitrifying bacteria. These bacteria are generally chosen from the group formed by bacteria of Nitrosomonas and Nitrobacter type.

According to one preferred embodiment of the invention, the first reactor comprises at least one mixing means. This advantageously makes it possible to promote the reactions that may take place in said first reactor.

According to one preferred embodiment of the invention, in the case where the support is mobile, the second reactor comprises at least one mixing means. This advantageously makes it possible to promote the reactions that may take place in said second reactor.

According to one preferred embodiment of the invention, in the case where the support is mobile, the third reactor comprises at least one mixing means. This advantageously makes it possible to promote the reactions that may take place in said third reactor.

The first reactor generally comprises at least one aeration means. This advantageously makes it possible to promote the reactions that may take place in said first reactor.

According to one preferred embodiment of the invention, the part of the effluent that is recycled into the second reactor via at least one recycling means may be a part of the effluent that can leave the third reactor.

According to one preferred embodiment of the invention, the recycling means is such that it can recycle some of the effluent that may be present in the third reactor.

In all cases, the device comprises at least one mixing means capable of mixing the part of the effluent that can leave the third reactor and/or that may be present in the third reactor, and which is recycled into the second reactor via at least one recycling means, with the effluent capable of being transported via a transportation means from the first reactor to the second reactor. Thus, the device according to the invention then comprises in combination, between the first and the second reactor, at least one transportation means, at least one effluent mixing means an also at least one means for introducing effluent into the second reactor.

The invention will be understood more clearly and other characteristics and advantages will emerge on reading the description that follows, which is given in a nonlimiting manner, with reference to the FIGURE.

The FIGURE diagrammatically shows a device 12 for treating effluent according to the invention.

Three reactors 3, 4 and 5, fed with an effluent provided by a conduit 1, in which matter in suspension (MIS) is present, perform a purification treatment in three steps and allow the exit, via a conduit 2 of a purified effluent, in which MIS is still present. The arrows symbolize the direction of travel of the effluents in the device 12. The effluent 1 enters the anaerobic treatment reactor 3. An effluent leaving therefrom is directed via a conduit 9 to an anoxic treatment reactor 4. The effluent leaving the reactor 4 via a conduit 10 feeds an aerobic treatment reactor 5. A recycling effluent that is conveyed to the reactor 4 via a conduit 11 leaves the reactor 5, via a recycling means, not shown. The reactor 3 comprises a mixing means 6. The reactor 4 comprises a mixing means 7. The reactor 5 comprises a mixing and aeration means 8, said aeration being symbolized by the presence of air bubbles 16. Moreover, the three reactors comprise a biomass on a mobile bed. The reactor 3 comprises a biomass 13. The reactor 4 comprises a biomass 14. The reactor 5 comprises a biomass 15.

The example that follows illustrates the invention without, however, limiting its scope.

EXAMPLE

In the example that follows, a device 12 as described in FIG. 1 is used. The reactors are filled to 40% with Bioflow 9 plastic onto which are fixed Desulfovibrio bacteria for the reactor 3, to 40% with Bioflow 9 plastic onto which are fixed Thiotrix bacteria for the reactor 4, and to 40% with Bioflow 9 plastic onto which are fixed Nitrosomonas and Nitrobacter bacteria for the reactor 5.

The results are given for a residence time of 12.5 hours.

To measure the removal of the carbon-based pollution, the Chemical Oxygen Demand (COD) at the exit of the second reactor 4 was measured. For all three reactors, the COD of the Applied Volume Load (AVL) is 0.31 kg/m$^3$.day (kg per m$^3$ and per day), and the COD of the Removed Volume Load (RVL) is 0.22 kg/m$^3$.day. The Applied Volume Load (AVL) is the volume load entering. The Removed Volume Load (RVL) is the volume load resulting from subtraction between the volume load entering and the volume load leaving. For the first reactor 3, the COD of the AVL is 0.84 kg/m$^3$.day and the COD of the RVL is 0.60 kg/m$^3$.day, for a residence time of 4.6 hours. The results are as follows, given in table 1.

TABLE 1

| | Removal of the soluble COD | | | |
|---|---|---|---|---|
| Feed COD (conduit 1) (mg/l) | COD at reactor 4 outlet (anoxic) (mg/l) | COD at reactor 5 outlet (aerobic) (mg/l) | COD yield of reactors 3 + 4 (%) | Overall COD yield of reactors 3 + 4 + 5 (%) |
| 161 | 48 | 45 | 70 | 72 |

Very good removal of the carbon-based pollution is thus found.

To measure the nitrification efficacy, the amount of N in NH$_4$ (N.NH$_4$) in the various effluents was measured. For the third reactor 5, the N.NH$_4$ of the AVL is 0.18 kg/m$^3$.day and the N.NH$_4$ of the RVL is 0.17 kg/m$^3$.day, for a residence time of 4.3 hours. The results are as follows, given in table 2.

TABLE 2

| | Nitrification | | | |
|---|---|---|---|---|
| Feed N.NH$_4$ (conduit 1) (mg/l) | N.NH$_4$ at the reactor 5 outlet (aerobic) (mg/l) | N.NO$_2$ at the reactor 5 outlet (aerobic) (mg/l) | N.NO$_3$ at the reactor 5 outlet (aerobic) (mg/l) | Yield of converted N.NH$_4$ of the reactor 5 (%) |
| 32.2 | 1.2 | 3.1 | 13 | 96.3 |

It is thus found that the nitrification yield is very good.

To measure the denitrification efficacy, the amount of N in NO$_3$ (N.NO$_3$) in the various effluents was measured. For the second reactor 4, the N.NO$_3$ of the AVL is 0.21 kg/m$^3$.day, and the N.NO$_3$ of the RVL is 0.18 kg/m$^3$.day, for a residence time of 4.3 hours. The results are as follows, given in table 3.

TABLE 3

| | Denitrification | | | | | |
|---|---|---|---|---|---|---|
| Feed N.NH$_4$ (conduit 1) (mg/l) | N.NO$_2$ at the reactor 4 outlet (anoxic) (mg/l) | N.NO$_3$ at the reactor 4 outlet (anoxic) (mg/l) | N.NH$_4$ at the reactor 5 outlet (aerobic) (mg/l) | N.NO$_2$ at the reactor 5 outlet (aerobic) (mg/l) | N.NO$_3$ at the reactor 5 outlet (aerobic) (mg/l) | Yield of removed N.NO$_3$ of the reactor 5 (%) |
| 32.2 | 1.2 | 1.1 | 1.2 | 3.1 | 13 | 48.1 |

It is thus found that, for a recycling proportion of about 100%, which is the proportion applied here (relationship between the effluent recycled via the conduit 11 and the reactor 4 over the effluent entering via the conduit 9 into the reactor 4), the overall denitrification yield approaches 50%.

The presence of a large amount of sulfur (native) in the effluent 2 is observed.

Moreover, in order to evaluate the fate of the sulfates, the concentration of S in SO$_4$ in the various effluents is observed, as summarized below in table 4. For the first reactor 3, the S.SO$_4$ of the AVL is 0.24 kg/m$^3$.day (in S.SO$_4$) and the S.SO$_4$ of the RVL is 0.16 kg/m$^3$.day, for a residence time of 4.6 hours. The results are as follows, given in table 4.

TABLE 4

| | Sulfate reduction and sulfur oxidation | | | |
|---|---|---|---|---|
| Feed S.SO$_4$ (CONDUIT 1) (mg/l) | S.SO$_4$ at the reactor 3 outlet (anaerobic) (mg/l) | S.SO$_4$ at the reactor 4 outlet (anoxic) (mg/l) | S.SO$_4$ at the reactor 5 outlet (aerobic) (mg/l) | Yield of converted S.SO$_4$ of the reactor 3 (%) |
| 46.7 | 15.9 | 42.8 | 45.9 | 65.9 |

A reduction of the sulfates under anaerobic conditions with a yield close to 66%, a reoxidation of the sulfides formed under anaerobic conditions in the denitrification reactor 4, and completion of the oxidation of sulfur to sulfate in the aerobic reactor 5, to return to values very close to those of the feed, are clearly seen from these results.

Moreover, it was found that the sulfate reduction is clearly correlated with the removal of the COD.

The invention claimed is:

1. A process for the biological treatment of an effluent in order to purify it, comprising a first treatment of the majority of said effluent in a first step of anaerobic biological treatment by the way of a biomass is fixed onto a mobile support, giving a first effluent, the biomass present in the first step comprising at least sulfate-reducing bacteria, followed by a second treatment of the majority of the first effluent, in a second step of anoxic biological treatment, by the way of a fixed biomass, giving a second effluent, the biomass present in the second step comprising at least sulfur-oxidizing bacteria, and finally a third treatment of the majority of the second effluent in a third step of aerobic biological treatment, by the way of a fixed biomass, giving a third purified effluent, the biomass present in the third step comprising at least nitrifying bacteria, wherein the process also comprises recycling of some of the effluent present in the third step into the second step.

2. The process as claimed in claim 1, wherein the majority of the effluent to be treated in said process is screened, decanted, or screened and decanted, in a step prior to the first treatment process.

3. The process as claimed in claim 1, wherein the majority of the third effluent derived from the said process is decanted.

4. The process as claimed in claim 1, wherein the second step of the anoxic treatment is a treatment by the way of a biomass fixed onto a mobile support or onto a fixed support.

5. The process as claimed in claim 1, such that the third step of the aerobic treatment is a treatment by the way of a biomass fixed onto a mobile support or onto a fixed support.

6. The process as claimed in claim 1, comprising the use of a device comprising a first treatment reactor, comprising a biomass fixed onto a mobile support, followed by a second anoxic treatment reactor, comprising a fixed biomass, and finally a third aerobic treatment reactor, comprising a fixed biomass, and also a conduit for transporting effluent to the first reactor, a conduit for transporting the first effluent from the first to the second reactor, a conduit for transporting the second effluent from the second to the third reactor, and a conduit for removing effluent from the third reactor, said device also comprising at least one means for recycling from the third reactor to the second reactor.

7. The process as claimed in claim 1, comprising the use of a device comprising a first treatment reactor, comprising a biomass fixed onto a mobile support, followed by a second anoxic treatment reactor, comprising a fixed biomass, and finally a third aerobic treatment reactor comprising a biomass, and also a conduit for transporting effluent to the first reactor, a conduit for transporting the first effluent from the first to the second reactor, a conduit for transporting the second effluent from the second to the third reactor, and a conduit for removing effluent from the third reactor, said device also comprising at least one means for recycling from the third reactor to the second reactor, wherein the first reactor comprises at least one mixing means.

8. The process as claimed in claim 1, comprising the use of a device comprising a first treatment reactor, comprising a biomass fixed onto a mobile support, followed by a second anoxic treatment reactor, comprising a fixed biomass, and finally a third aerobic treatment reactor comprising a biomass, and also a conduit for transporting effluent to the first reactor, a conduit for transporting the first effluent from the first to the second reactor, a conduit for transporting the second effluent from the second to the third reactor, and a conduit for removing effluent from the third reactor, said device also comprising at least one means for recycling from the third reactor to the second reactor, wherein the second reactor comprises at least one mixing means.

9. The process as claimed in claim 1, comprising the use of a device comprising a first treatment reactor, comprising a biomass fixed onto a mobile support, followed by a second anoxic treatment reactor, comprising a fixed biomass, and finally a third aerobic treatment reactor comprising a biomass, and also a conduit for transporting effluent to the first reactor, a conduit for transporting the first effluent from the first to the second reactor, a conduit for transporting the second effluent from the second to the third reactor, and a conduit for removing effluent from the third reactor, said device also comprising at least one means for recycling from the third reactor to the second reactor, wherein the third reactor comprises at least one mixing means.

10. The process as claimed in claim 1, comprising the use of a device comprising a first treatment reactor, comprising a biomass fixed onto a mobile support, followed by a second anoxic treatment reactor, comprising a fixed biomass, and finally a third aerobic treatment reactor comprising a fixed biomass, and also a conduit for transporting effluent to the first reactor, a conduit for transporting the first effluent from the first to the second reactor, a conduit for transporting the second effluent from the second to the third reactor, and a conduit for removing effluent from the third reactor, said device also comprising at least one means for recycling from the third reactor to the second reactor, wherein the third reactor comprises at least one aeration means.

* * * * *